US011900351B2

(12) United States Patent
Calagaz

(10) Patent No.: US 11,900,351 B2
(45) Date of Patent: Feb. 13, 2024

(54) MARINE EQUIPMENT INVENTORY TOOL

(71) Applicant: Fishing Chaos, Inc, Mobile, AL (US)

(72) Inventor: John Calagaz, Mobile, AL (US)

( * ) Notice: Subject to any disclaimer, the term of this patent is extended or adjusted under 35 U.S.C. 154(b) by 373 days.

(21) Appl. No.: 17/382,319

(22) Filed: Jul. 21, 2021

(65) Prior Publication Data

US 2021/0350350 A1 Nov. 11, 2021

Related U.S. Application Data

(63) Continuation-in-part of application No. 17/366,507, filed on Jul. 2, 2021, which is a continuation of application No. 17/133,419, filed on Dec. 23, 2020, which is a continuation of application No. 17/002,776, filed on Aug. 26, 2020, now Pat. No. 10,906,612, which is a continuation of application No. 16/858,840, filed on Apr. 27, 2020, now Pat. No. 10,789,434, which is a continuation of application No. 16/036,795, filed on Jul. 16, 2018, now Pat. No. 10,679,022.

(60) Provisional application No. 62/532,994, filed on Jul. 15, 2017.

(51) Int. Cl.
*G06K 7/10* (2006.01)
*G06Q 50/02* (2012.01)
*G06Q 20/20* (2012.01)
*A01K 97/06* (2006.01)
*G06K 19/07* (2006.01)

(52) U.S. Cl.
CPC ............ *G06Q 20/203* (2013.01); *A01K 97/06* (2013.01); *G06K 7/10297* (2013.01); *G06K 19/0723* (2013.01); *G06Q 20/202* (2013.01); *G06K 2007/10504* (2013.01)

(58) Field of Classification Search
CPC ........... G06K 7/10297; G06K 7/10366; G06Q 50/02; G06Q 20/203
USPC ...................................................... 235/385
See application file for complete search history.

(56) References Cited

U.S. PATENT DOCUMENTS

2016/0283898 A1* 9/2016 Reuther ............... G06Q 10/087

* cited by examiner

*Primary Examiner* — Toan C Ly
(74) *Attorney, Agent, or Firm* — AdamsIP, LLC; Edward Brinkley Garner, III; James Hunter Adams

(57) ABSTRACT

A system and method for tracking marine equipment is provided. Generally, the system and method of the present disclosure are designed to generate indicia corresponding to the inventory level of marine equipment used for a particular marine activity. To facilitate the assignment of indicia reflecting the inventory level of marine equipment used for a marine activity, the system and method of the present disclosure uses a plurality of equipment profiles having a defined lower limit and quantity associated with each piece of marine equipment. The lower limit may be manually input or automatically generated. The quantity may be tracked by the system using equipment transmitters and equipment sensors. In a preferred embodiment, the indicia indicate whether the quantity of a piece of marine equipment has fallen below a certain specified level as defined by the user. Users may purchase new marine equipment from third-party retailers via the user interface.

20 Claims, 7 Drawing Sheets

MARINE EQUIPMENT INVENTORY TOOL

CROSS REFERENCES

This application is a continuation-in-part of a co-pending U.S. patent application Ser. No. 17/366,507 filed Jul. 2, 2021, which is a continuation of a co-pending U.S. patent application Ser. No. 17/133,419 filed Dec. 23, 2020, which claims priority to U.S. patent application Ser. No. 17/002, 776 filed Aug. 26, 2020, which claims priority to U.S. patent application Ser. No. 16/858,840 filed Apr. 27, 2020, which claims priority to U.S. patent application Ser. No. 16/036, 795 filed Jul. 16, 2018, which claims priority to U.S. Provisional Application Ser. No. 62/532,994, filed on Jul. 15, 2017, in which all applications are incorporated herein in their entirety by reference.

FIELD OF THE DISCLOSURE

The subject matter of the present disclosure refers generally to a system and method for tracking and replacing marine equipment used for marine activities.

BACKGROUND

Before embarking on a fishing excursion, fishermen often visit tackle shops to replace fishing tackle lost or damaged during previous fishing excursions. If the fisherman fails to replace lost or damage fishing tackle, it may affect the success of their next fishing outing because it may result in situations where a certain lure is needed due to certain environmental conditions but is unavailable due to not being replaced. For instance, from late spring and early fall, a dry fly may be a very effective fly for a fisherman to use while fly fishing in the northwest. However, after this season, a fisherman may have difficulty catching fish using a dry fly since flies are less likely to be an active pray from late fall to early spring. Instead, a fisherman may be better off using a streamer. If a fisherman does not have a streamer in his tackle box due to failure to replace lost or damaged streamers from previous fishing excursions, the fisherman will have to choose from a group of bad scenarios on what they should do. For instance, the fisherman may have to decide whether to stop fishing for the day, drive to a tackle shop to replace the missing tackle, or change their angling strategy by using on hand fishing tackle. The use of on hand fishing tackle could potentially ruin a fishing outing as it may seriously handicap a fisherman's ability to catch fish if it is not optimal considering the environmental conditions. If the fisherman decides to forgo the fishing outing all together or drive to a tackle shop to replace the lost or damaged fishing tackle, valuable time will have been wasted.

Because there are many different kinds of lures and other pieces of fishing tackle, it is often difficult for a fisherman to keep track of what tackle needs to be replaced. Additionally, fisherman often use multiple pieces of tackle in a single outing, making the task of keeping track of their tackle box inventory that much more difficult. If a fisherman is not entirely sure what is in their tackle box, they may purchase too much or too little of a particular piece of tackle in preparation for an upcoming fishing excursion. Purchasing too much tackle of a certain kind unnecessarily reduces a fisherman's funds that might otherwise have been used on something else. Purchasing too little tackle of a certain kind may cause the fisherman to run out of a particular piece of tackle sooner than expected, which may cause the fisherman to waste time due to redundant trips to the tackle shop. Additionally, failure to accurately track the inventory of a tackle box may result in the fisherman unintentionally not replacing a specific piece of tackle altogether, thus causing the fisherman to make an otherwise unnecessary trip to a tackle shop or forcing the fisherman to use suboptimal fishing tackle during a fishing excursion.

Additionally, fishermen may have multiple tackle boxes designated for a specific species of fish since the contents of a tackle box may change depending on the species of fish a fisherman desires to catch. For instance, a fisherman angling for largemouth bass will not necessarily use the same tackle as a fisherman angling for catfish. Nor will a fisherman angling for tuna necessarily use the same fishing tackle as a fisherman angling for rainbow trout. The contents of a tackle box may also change when the style of angling a fisherman desires to employ changes. For instance, a fisherman desiring to troll for sailfish will not necessarily use the same kind of fishing tackle as a fisherman desiring to pitch cast for bass. For instance, a fisherman desiring to surf fish for red fish will not necessarily use the same kind of fishing tackle as a fisherman desiring to fly fish for bone fish. Keeping track of multiple tackle boxes having fishing tackle for different purposes is tedious and may result in a fisherman forgetting to replace a specific piece of tackle while at the tackle shop or buying the wrong tackle all together. Having multiple tackle boxes for different purposes may also cause confusion, which may result in important pieces of tackle not being replaced prior to a specific kind of fishing excursion.

Accordingly, there is a need in the art for a system and method for tracking tackle in a tackle box so that a fisherman may more easily know what tackle is currently in their possession.

SUMMARY

A system and method for tracking marine equipment inventory used in various marine activities is provided. Generally, the system and method of the present disclosure are designed to provide a user with an up-to-date account of the marine equipment currently in the user's possession. More specifically, the system and method are designed to track fishing tackle currently in a fisherman's tacklebox and warn the fisherman when a specific piece of tackle needs to be replaced. The system of the present disclosure may comprise marine equipment, an equipment transmitter, an equipment sensor, a processor operably connected to the equipment sensor, a non-transitory computer-readable medium coupled to the processor, a computing device having a user interface, and a display. In a preferred embodiment, the system and method of the present disclosure may generate displayable indicia corresponding to the inventory levels of a specific piece of marine equipment, which may be presented to the user via a display. The indicia indicate to the user whether or not the inventory of a piece of marine equipment has dropped below a certain specified level. In another embodiment, the system may be linked to a third-party retailer's Point-of-Sale system in a way such that the user may purchase new marine equipment via the user interface.

To facilitate the assignment of indicia reflecting the current inventory levels of marine equipment, the system and method of the present disclosure uses a plurality equipment profiles stored within a database. Each equipment profile corresponds to a particular marine activity enjoyed by the user, and each equipment profile has equipment data for marine equipment associated therewith. A marine activity may have multiple equipment profiles. Each piece of marine equipment within an equipment profile has a defined lower limit and a quantity. A lower limit is the minimum amount of a particular piece of marine equipment that a user would prefer to have for a particular marine activity. Quantity is the amount of that particular piece of marine equipment a user currently has in their possession. The lower limits associated with each piece of marine equipment may be manually defined by the user or automatically generated by the system. Quantity is tracked and updated via equipment sensors and equipment transmitters operably connected to a processor of the system. Preferably, the quantity may be updated in real time. Once equipment profiles have been created, the system may perform a query to determine whether or not any marine equipment inventory level is low. By comparing the lower limit with the quantity, the system may generate indicia that may warn a user when they are running low of a particular piece of marine equipment. The processor may assign and transmit indicia generated for each piece of marine equipment to the user interface and may present these indicia to a user via a display.

This system allows a user to know what tackle is in their tackle box at all times. This will help a user with time management by reducing the amount of unplanned trips that the user must make to a tackle shop. This system and method will also help prevent situations in which suboptimal equipment must be used due to missing tackle. This in turn should help the user be a more successful angler overall, which will increase the quality of their fishing experience.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other systems for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of managing equipment of a marine activity without human intervention, and thereby improving upon known systems currently employed within the art.

Figure 1:
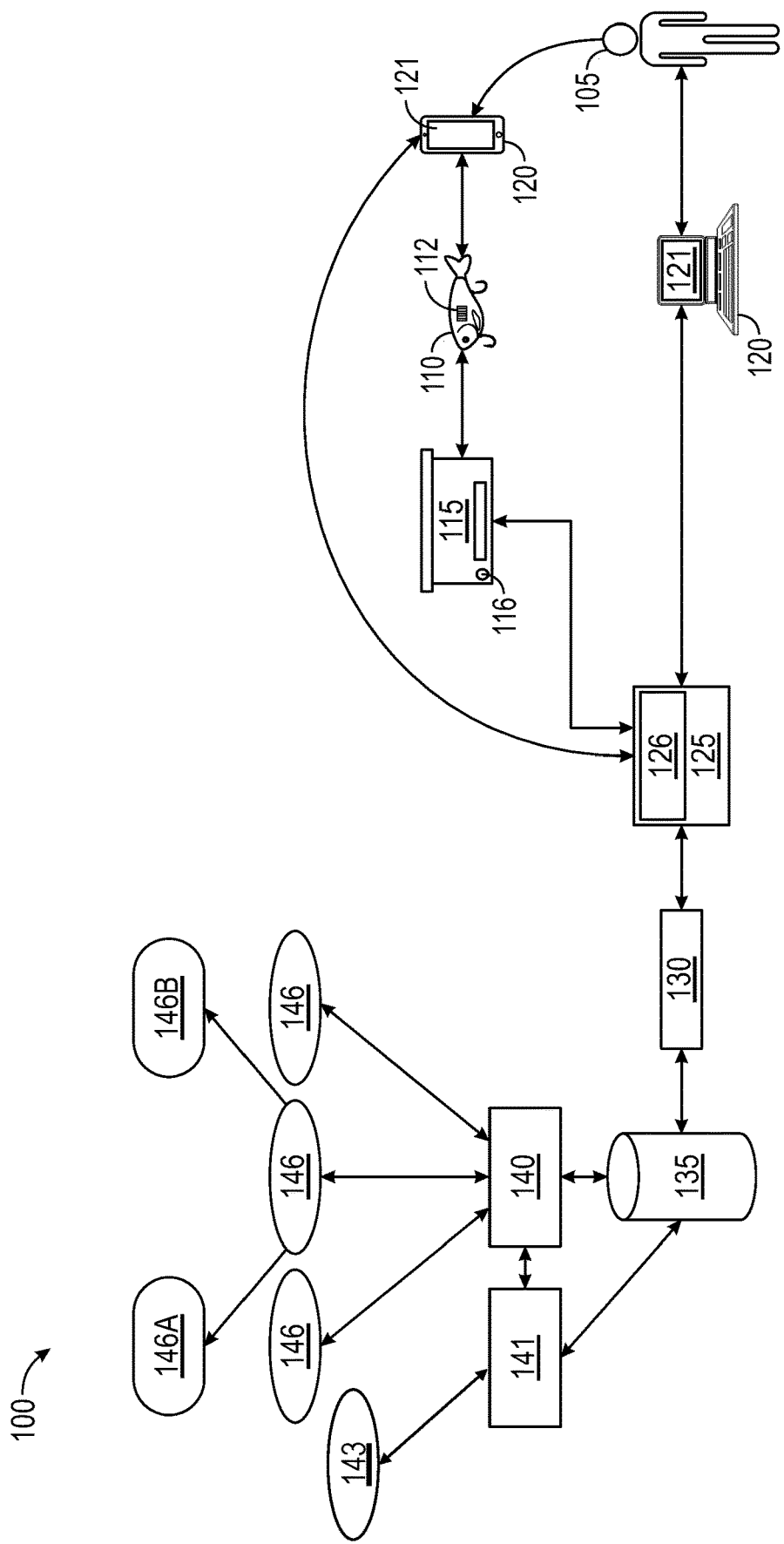
FIG. 1 is a diagram illustrating a system embodying features consistent with the principles of the present disclosure.

FIGS. 1-7 illustrate preferred embodiments of a system 100 and methods designed to assess quantity 146A of marine equipment 110 and subsequently generate and display indicia reflecting whether or not the quantity 146A of a particular piece of marine equipment 110 is below a lower limit 146B set by a user 105. As shown in FIG. 1, the system 100 of the present disclosure may comprise marine equipment 110, an equipment transmitter 112, an equipment sensor 116, a processor 125 operably connected to the equipment sensor 116, a non-transitory computer-readable medium 126 coupled to the processor 125 and having instructions stored thereon, and a database 135 operably connected to the processor 125. In a preferred embodiment, the equipment sensor 116 is a component of a tackle box 115 configured to hold said marine equipment 110. In one embodiment, a computing device 120 having a user interface 111 may be operably connected to the processor 125. In another embodiment, a server 130 may be operably connected to the database 135 and processor 125, facilitating the transfer of information between the processor 125 and database 135. The various components of the system 100 of the present disclosure may be operably connected to one another via a wired or wireless connection via a communication device. The database 135 may be populated by a user 105 who uploads information either directly to the database 135 or who inputs data into the user interface 121 of the computing device 120 that subsequently transfers the data to the database 135 via the processor 125. Some preferred embodiments of the system 100 may also comprise a geolocation device, which may be used to obtain geospatial data related to a position of at least one of the marine equipment 110, tackle box 115, and user 105.

Figure 2:
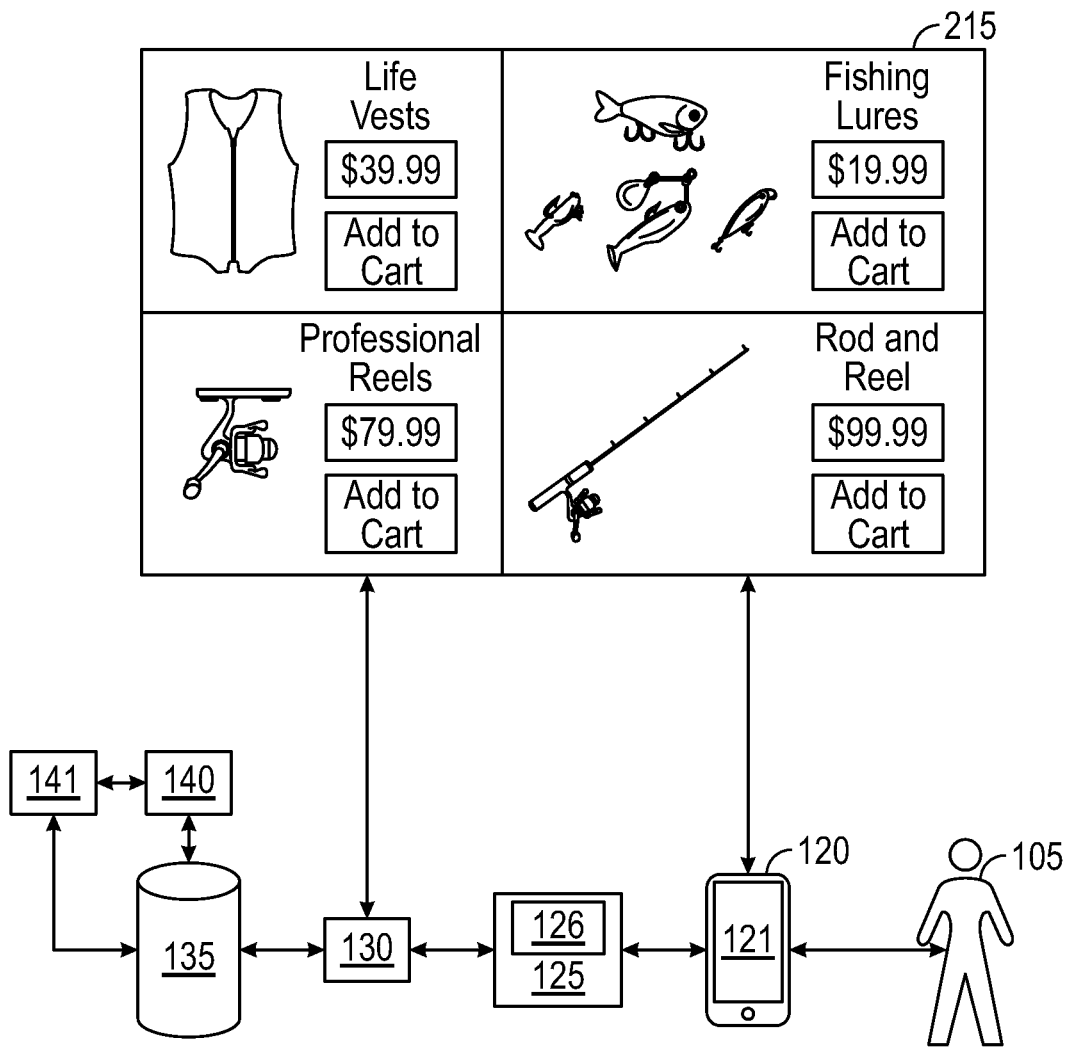
FIG. 2 is a diagram illustrating a system embodying features consistent with the principles of the present disclosure.
Figure 3:
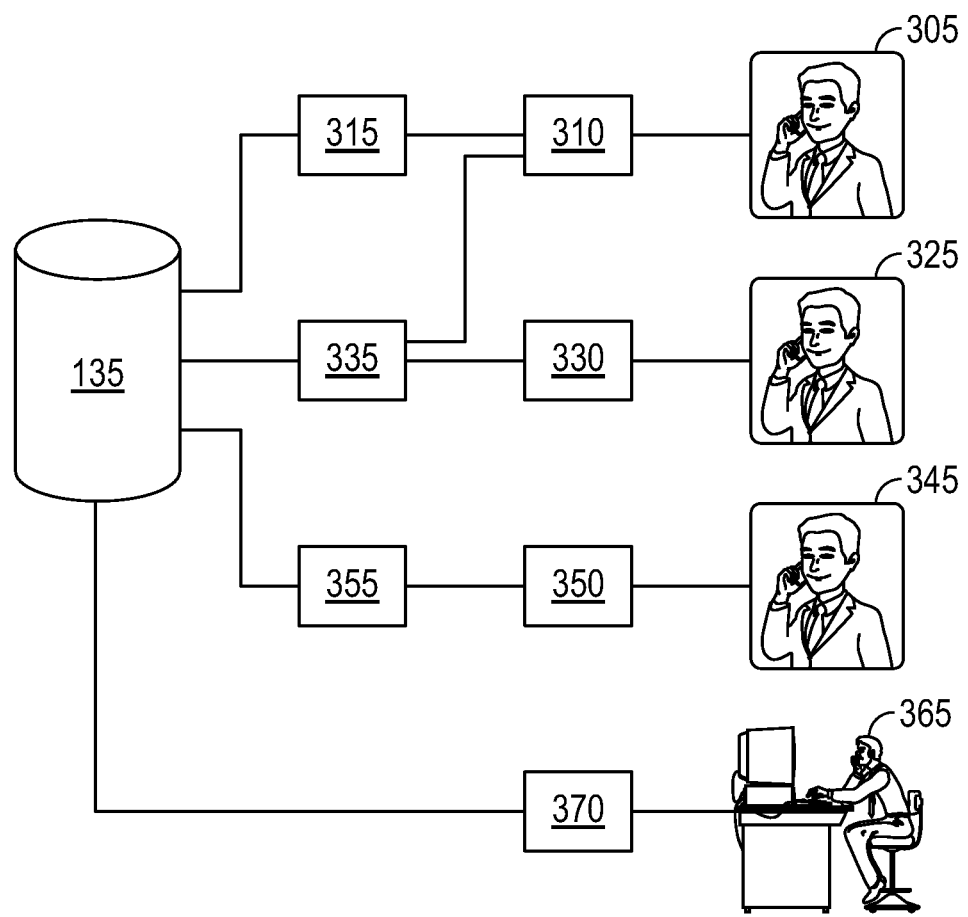
FIG. 3 is a diagram illustrating the manner in which individual access to data may be granted or limited based on user roles or administrator roles.
Figure 4:
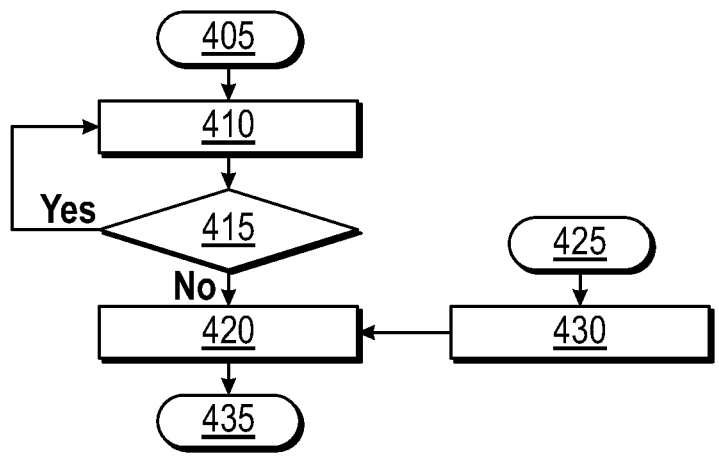
FIG. 4 is a flow chart illustrating certain method steps of a method embodying features consistent with the principles of the present disclosure.
Figure 5:
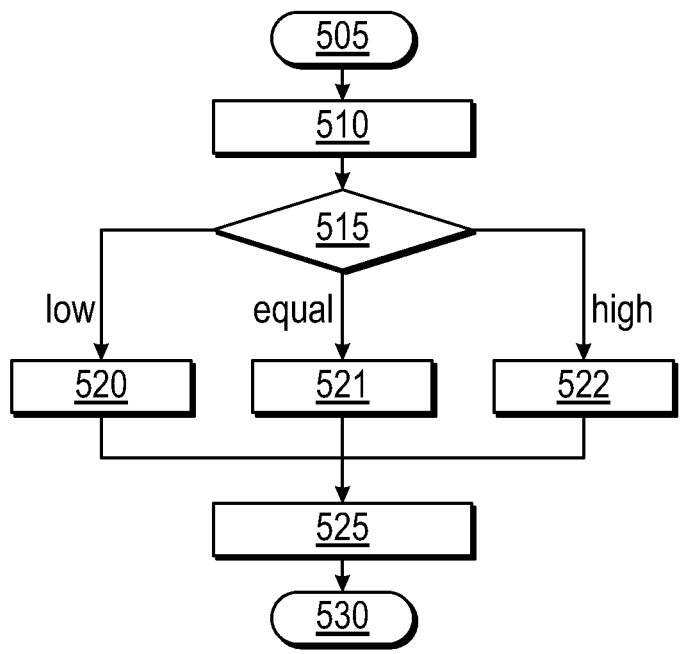
FIG. 5 is a flow chart illustrating certain method steps of a method embodying features consistent with the principles of the present disclosure.
Figure 6:
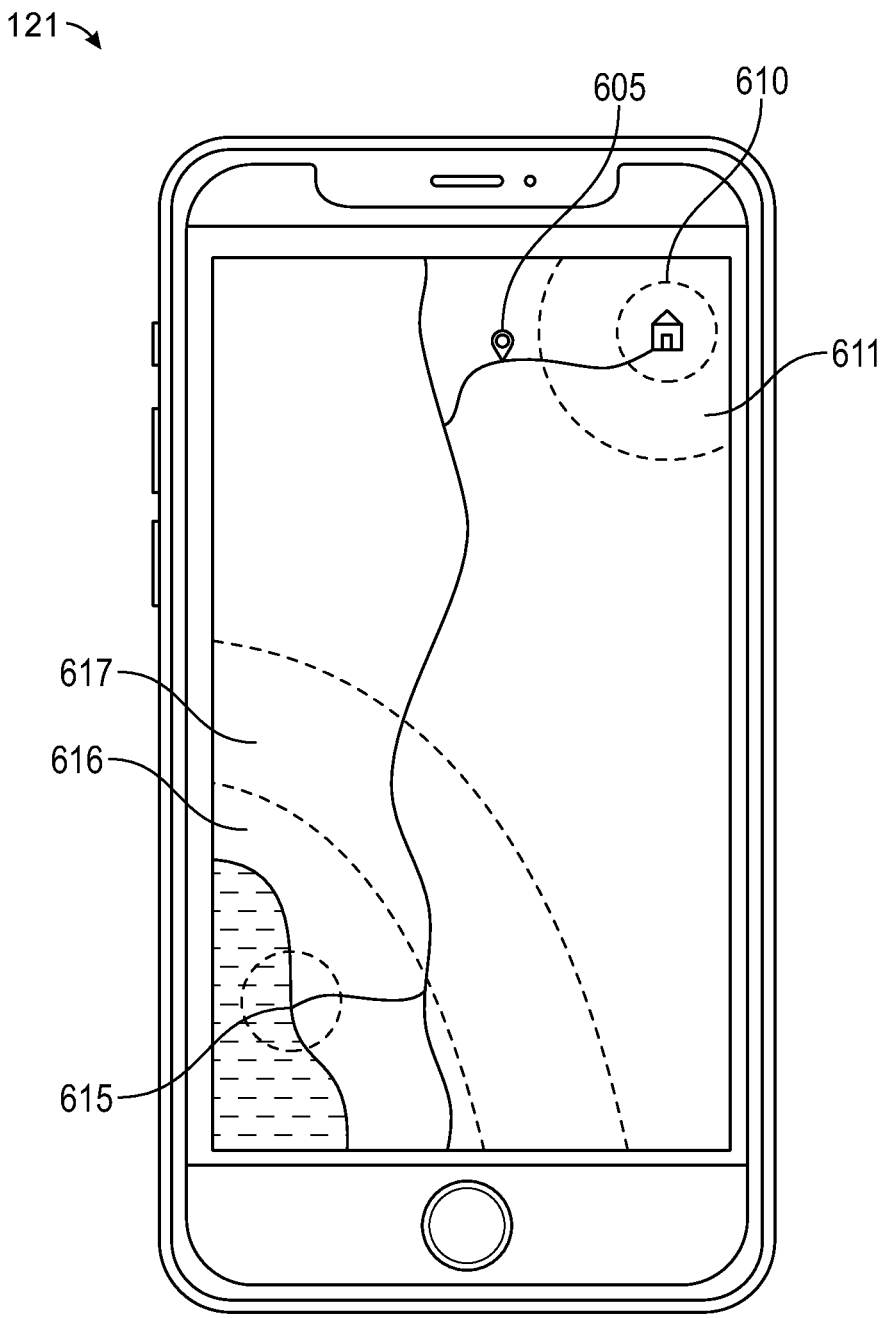
FIG. 6 is a diagram illustrating a system embodying features consistent with the principles of the present disclosure.
Figure 7:
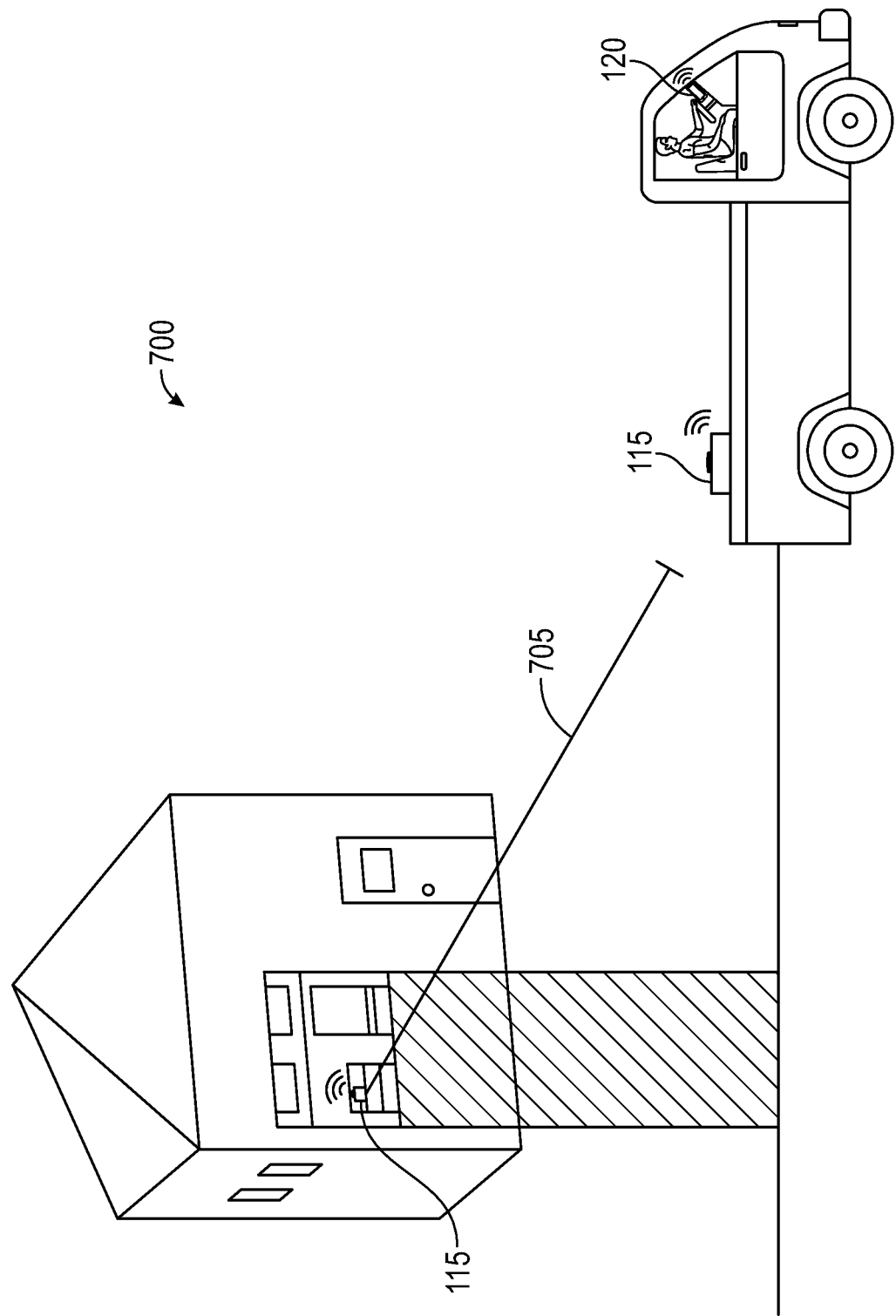
FIG. 7 is an environmental view of the system being used by a user within an environment.

FIG. 1 illustrates a preferred embodiment of a system configured to assist a user manage marine equipment. FIG. 2 illustrates how a user 105 may purchase marine equipment 110 through the system 100 from a third-party retailer 215. FIG. 3 illustrates permission levels that may be utilized by the present system 100 for controlling access to user content 315, 335, 355. FIGS. 4 and 5 show various methods that may be carried out by the system 100. FIG. 6 illustrates a user interface 121 of a computing device 120 that may be used by a user 105 to select geographic zones 143 that may be used by the system 100 to alert a user 105 that at least one tackle box 115 containing marine equipment 110 that is to be used during a marine activity is not in currently the user's 105 possession. FIG. 7 is an environmental view of the system 100 being used within an environment 700, wherein the user 105 is leaving a designated geographic zone 143. It is understood that the various method steps associated with the methods of the present disclosure may be carried out as operations by the system 100 shown in FIG. 1.

As mentioned previously, the system 100 is designed to track quantity 146A of marine equipment 110 used for various marine activities. Types of marine equipment 110 that may be tracked by the system 100 include, but are not limited to, scuba diving equipment, snorkeling equipment, sailing equipment, windsurfing equipment, skiing equipment, and fishing equipment, or any combination thereof. A marine activity is an avocation or occupation that may be executed in a body of water. As such, marine equipment 110 may be any gear used while participating in a particular marine activity. For instance, the system 100 may track marine equipment 110 of a user 105 participating in the marine activity of scuba diving, wherein said scuba diving equipment may include, but is not limited to, a regulator, snorkel, dive mask, depth gauge, scuba fins, etc. For instance, the system 100 may track marine equipment 110 of a user 105 participating in the marine activity of water skiing, wherein said water skiing equipment may include, but is not limited to, a life jacket, water skis, ski rope, wetsuit, etc. In a preferred embodiment, marine equipment 110 refers to particular pieces of fishing equipment that may be used when participating in the marine activity of fishing. Types of marine equipment 110 used in the marine activity of fishing may include, but is not limited to, lures, rods, reels, hooks, monofilament line, weights, and nets, or any combination thereof. Therefore, the present disclosure may generally be directed towards helping a fisherman manage various types of fishing tackle.

The system 100 is designed to track marine equipment 110 fitted with an equipment transmitter 112. The equipment transmitter 112 may broadcast a signal containing information about marine equipment 110 to the processor 125. In a preferred embodiment, the equipment transmitter 112 may be attached to the marine equipment 110 in a way such that the equipment transmitter 112 is associated with only that particular piece of marine equipment 110. Therefore, an equipment transmitter 112 may broadcast a signal including information only relevant to the marine equipment 110 to which the equipment transmitter 112 is attached. For instance, a jointed minnow lure having an equipment transmitter 112 may broadcast a signal containing information pertaining only to features relevant to that particular jointed minnow lure. For instance, a fast action rod having an equipment transmitter 112 may broadcast a signal containing information pertaining only to features relevant to that particular fast action rod. In another preferred embodiment, the equipment transmitter 112 may be attached to marine equipment 110 in a way such that the equipment transmitter 112 is associated with multiple pieces of marine equipment 110. Therefore, an equipment transmitter 112 may broadcast a signal containing information relevant to multiple pieces of marine equipment 110. For instance, an equipment transmitter 112 attached to a container of plastic worms may broadcast a signal containing information pertaining to the entire container of plastic worms. For instance, an equipment transmitter 112 attached to a rod and reel combination may broadcast a signal containing information pertaining to both the rod and reel.

Information contained within the signal broadcast by the equipment transmitter 112 may include, but is not limited to, size, color, shape, brand, model number, construction material, etc. For instance, a signal broadcast by an equipment transmitter 112 attached to a particular rod may contain information that the rod is a black 8'6" G-Loomis® IMX 1025-2S Surf Rod with a line rating of twelve to twenty-five lbs. For instance, a signal emitted from an equipment transmitter 112 attached to a particular lure may contain information that the lure is a F03 Rainbow Rapala® Original Floating Minnow having two #12 treble hooks. Types of devices that may act as the equipment transmitter 112 include, but are not limited, to near field communication (NFC), Bluetooth, infrared (IR), radio-frequency communication (RFC), radio-frequency identification (RFID), and ANT+, or any combination thereof. In an embodiment, equipment transmitters 112 may broadcast signals of more than one type. For instance, an equipment transmitter 112 comprising an IR transmitter and RFID transmitter may broadcast IR signals and RFID signals. Alternatively, an equipment transmitter 112 may broadcast signals of only one type of signal. For instance, lures may be fitted with equipment transmitters 112 that broadcast only RFC signals and rods may be fitted with equipment transmitters 112 that broadcast only IR signals.

The equipment sensor 116 detects the signals broadcast by the equipment transmitters 112 attached to marine equipment 110. As illustrated in FIG. 1, the equipment sensor 116 is operably connected to the processor 125. In a preferred embodiment, the equipment sensor 116 may be configured to detect a number of signal types that may be emitted by an equipment transmitter 112, including, but not limited to, NFC, Bluetooth, IR, RFC, RFID, and ANT+, or any combination thereof. For instance, an equipment sensor 116 may be configured to detect Bluetooth, NFC, and IR signals broadcast by one or more equipment transmitters 112. Alternatively, the equipment sensor 116 may be configured to detect only one type signal emitted by an equipment transmitter 112. For instance, a tackle box 115 may be fitted with an equipment sensor 116 that only detects IR signals. Whenever a lure fitted with an IR tag is placed into or removed from the tackle box 115, the equipment sensor 116 may detect the addition or removal of the lure and update the quantity 146A accordingly. For instance, a storage compartment on a marine vehicle may be fitted with an equipment sensor 116 that may detect RFID signals. Whenever skiing equipment fitted with an RFID tag is placed into or removed from the storage compartment, the equipment sensor 116 may detect the addition or removal and update the quantity 146A accordingly. For instance, a rack for storing scuba equipment may be fitted with an equipment sensor 116 that may detect NFC signals. Whenever a piece of scuba equipment is added to or removed from the rack, the equipment sensor 116 may detect the addition or removal and update the quantity 146A accordingly. As such, marine equipment 110, equipment transmitters 112, and equipment sensors 116 may be combined in multiple ways without departing from the inventive subject matter as described herein.

The processor 125 is configured to perform the operations disclosed herein based on instructions stored within the system 100. The processor 125 may be any processor or microprocessor suitable for executing instructions. In some embodiments, the processor 125 may have a memory device therein or coupled thereto suitable for storing the data, content, or other information or material disclosed herein. In some instances, the processor 125 may be a component of a larger computing device 120. The processor 125 may process instructions for execution within computing devices 120, including instructions stored in memory or on a storage device, to display graphical information for a graphical user interface (GUI) on an external input/output device, such as a display. The processor 125 may provide for coordination of the other components of a computing device 120, such as control of user interfaces, applications run by a computing device 120, and wireless communication by a communication device of the computing device 120. A computing device 120 that may house the processor 125 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

In a preferred embodiment, the programming instructions responsible for the operations carried out by the processor 125 are stored on a non-transitory computer-readable medium ("CRM"), which may be coupled to the server 130, as shown in FIG. 1. Alternatively, the programming instructions may be stored or included within the processor 125. Examples of non-transitory computer-readable mediums include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium. The software instructions may be read into memory from another non-transitory computer-readable medium 126 or from another device. Alternatively, hardwired circuitry may be used in place of or in combination with software instructions to implement processes consistent with the principles of the invention. Thus, implementations consistent with the principles of the invention are not limited to any specific combination of hardware circuitry and software.

Once the equipment sensor 116 detects a signal broadcast by an equipment transmitter 112 connected to a piece of marine equipment 110, the equipment sensor 116 may transmit the marine equipment data 146 within the signal to the processor 125. The processor 125 may transform the marine equipment data 146 into an equipment profile 140 on the non-transitory computer-readable medium 126. For instance, equipment sensor 116 may transfer information pertaining to a jointed minnow lure having an equipment transmitter 112 to the processor 125, which may transform the information into an equipment profile 140 on the non-transitory computer-readable medium 126. For instance, an equipment sensor 116 may transfer information pertaining to a scuba tank having an equipment transmitter 112 o the processor 125, which may transform the information into an equipment profile 140 on the non-transitory computer-readable medium 126. In one preferred embodiment, equipment profiles 140 may subsequently be placed in an activity profile 141 of the user 105. For instance, an equipment transmitter 112 attached to a rooster tail lure may broadcast information pertaining to that rooster tail lure, which may be detected by the equipment sensor 116 and subsequently added to a user's 105 equipment profile 140 via the processor 125. The updated equipment profile 140 may then subsequently be updated in a user's 105 activity profile 141. An activity profile 141 may represent information pertaining to a marine activity at a particular time and place. This data may include, but is not limited to, environmental data, geospatial data, type of marine species caught, etc. Equipment profiles 140 preferably contain marine equipment data 146 about particular pieces or types of fishing tackle that may be a part of a user's 105 tackle box 115. This data may include, but is not limited to, the quantity, weight, color, and an image of a particular piece of marine equipment 110, or any combination thereof.

Marine equipment data 146 may be updated by the equipment sensor 116 operably connected to a processor 125 automatically using NFC, Bluetooth, infrared, RFC, RFID, and ANT+, or any combination thereof, but is not limited to these methods. For instance, a tackle box 115 fitted with equipment sensor 116 may detect fishing tackle fitted with an NFC device in a way such that the equipment sensor 116 may determine when a lure has been added or removed from the tackle box 115. The equipment sensor 116 may then communicate with the processor 125 in a way such that the marine equipment data 146 associated with the lure fitted with the NFC device may be automatically updated within an equipment profile 140 of the non-transitory computer-readable medium 126 and/or database 135. In another preferred embodiment, a tackle box 115 may be fitted with an equipment sensor 116 that may additionally detect changes in weight. When fishing tackle is removed from or added to the tackle box 115, the equipment sensor 116 may communicate with the processor 125 in a way such that it may relay the amount of fishing tackle removed from or added to the tackle box 115 based on the change it weight. In this way, the system 100 may update the quantity 146A of fishing tackle within a user's 105 tackle box 115 in real time using weight data.

In an embodiment, the system 100 may further comprise a computing device 120 operably connected to the processor 125. A computing device 120 may be implemented in a number of different forms, including, but not limited to, servers, multipurpose computers, mobile computers, etc. For instance, a computing device 120 may be implemented in a multipurpose computer that acts as a personal computer for a user 105, such as a laptop computer. For instance, components from a computing device 120 may be combined in a way such that a mobile computing device is created, such as mobile phone. Additionally, a computing device 120 may be made up of a single computer or multiple computers working together over a network. For instance, a computing device 120 may be implemented as a single server 130 or as a group of servers 130 working together over and Local Area Network (LAN), such as a rack server system 100. Computing devices 120 may communicate via a wired or wireless connection. For instance, wireless communication may occur using a Bluetooth, Wi-Fi, or other such wireless communication device.

In a preferred embodiment, as illustrated in FIG. 1, the computing device 120 is a mobile computing device. Mobile computing devices may include, but are not limited to, cellular telephones, smart phones, personal digital assistants, tablet computers, or other similar mobile computing devices. In an embodiment, computing devices 120 may communicate audibly, meaning computing devices 120 may transmit and receive information via sound waves and covert the sound waves into digital information. For instance, a user 105 may instruct a user interface 121 of a computing device 120 with their voice to perform a certain action. The processor 125 may convert the sound waves of the user 105 into instructions, which the processor 125 may then carry out. Computing devices 120 may likewise generate audible sound for a user 105, such as through an audio device. Such sound may include sound from voice telephone calls, recorded notes, voice messages, music files, etc. Audible sounds may also include sound generated by applications operating on a computing device 120. For instance, an application running on a mobile computing device may be configured in a way such that when a certain condition is met the application causes the mobile computing device to output a sound. For instance, an application may be configured in a way such that an alarming sound is emitted via an audio device connected to the computing device 120 at a certain time of day. For instance, the processor 125 may receive a signal indicating that an amount of marine equipment has gone below an equipment lower limit 146B. The processor 125 may then convert this signal into an audio message that may be sent to an audio device to make the user 105 aware of the low amount of marine equipment.

As mentioned previously, the computing device 120 may further comprise a user interface 121. A user interface 121 may be defined as a space where interactions between a user 105 and the system 100 may take place. In a preferred embodiment, the interactions may take place in a way such that a user 105 may control the operations of the system 100. A user interface 121 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. In some embodiments, the user interface 121 may be operably connected to back-end hardware, such as a server, and/or software that separately handles permission levels of the various users 105. The system 100 may present data of the user interface 121 to the user 105 via a display operably connected to the processor 125. A display may be defined as an output device that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 126 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of tactile information via a haptic suit, wherein the hard copy of the tactile information is stored within a database 135. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof.

Geolocation data used by the system 100 to perform the various functions is preferably obtained via a geolocation device. The geolocation device may be a single component or a component of a larger computing device 120. In one preferred embodiment, the geolocation device may comprise a plurality of devices working together to obtain a geolocation via triangulation. In a preferred embodiment, the geolocation device is a GPS sensor. The GPS sensor may measure and transmit geospatial data relevant for determining geolocation. A GPS sensor may be defined as a receiver having an antenna designed to communicate with a navigation satellite system. Geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a JPG, .TIF, .GIF or other picture file format. For instance, a map scanned in a flatbed scanner may be considered raster data.

A user 105 may manually or automatically update an equipment profile 140 using a computing device 120. In a preferred embodiment, the computing device 120 may comprise a user interface 121, which a user 105 may use to manually or automatically update an equipment profile 140. In a preferred embodiment, marine equipment data 146 may be automatically uploaded to the equipment profiles 140 using equipment transmitters and equipment sensors. In another preferred embodiment, marine equipment data 146 of an equipment profile 140 may be updated when a user 105 purchases marine equipment 110 from a third-party retailer 215 via the user interface 121. The computing device 120 hosting a user interface 121 may be operably connected to a third-party retailer's 215 Point-of-Sale system as illustrated in FIG. 2. In some preferred embodiments, geospatial data of a geolocation device operably connected to the user's computing device 120 may be used to connect the user 105 with third-party retailers closest to the user's current geolocation 605. The system 100 may then present the third-party retailers to the user 105 via the user interface 121 in the order of their proximity to the user's 105 current geolocation 605. In a preferred embodiment, the third-party retailers are presented in list form to the user 105; however, other methods may be used to present said third party-retailers without departing from the inventive subject matter described herein. When marine equipment 110 is purchased from a third-party retailer 215 by the user 105 via the user interface 121, the Point-of-Sale system may automatically communicate the marine equipment data 146 of the purchased marine equipment 110 to the computing device 120. The processor 125 may then transfer the purchased marine equipment data 146 from the computing device 120 to an equipment profile 140. In one preferred embodiment, the computing device 120 may ask the user 105 which equipment profile 140 the user 105 would like the purchased marine equipment data 146 to be updated. In another preferred embodiment, the system 100 may automatically add purchased marine equipment data 146 of purchased marine equipment 110 to an equipment profile 140 based on the quantity 146A of marine equipment 110 within the equipment profile 140 compared to the lower limit 146B. For instance, the system 100 may automatically add purchased marine equipment data 146 pertaining to plastic red tail worms purchased from Bass Pro Shop® via the user interface 121 to an equipment profile 140 representing a particular tackle box 115, wherein that particular tackle box 115 has a low quantity 146A of plastic red tail worms when compared to the lower limit 146B for plastic red tail worms. The computing device 120 may be operably connected to a third-party retailer's 215 Point-of-Sale system via the Bluetooth, Wi-Fi, or other such transceiver, but is not limited to these methods of communication.

In another preferred embodiment, the user 105 may manually update equipment profiles 140. This may be done through use of, but not limited to, a camera, scanning device, keyboard, mouse, voice recognition and/or biometric mechanisms, etc. For instance, a lure fitted with a bar code may be manually scanned by a user 105 with a computing device 120 having a scanning device, such as a smartphone camera, so that the processor 125 may automatically input marine equipment data 146 corresponding to the bar code into an equipment profile 140. For instance, a user 105 may use a keypad to manually input marine equipment data 146 into a user interface 121 hosted on a suitable computing device 120. Once a user 105 has manually entered the marine equipment data, the data may be transferred to an equipment profile 140 within the non-transitory computer-readable medium 126 and/or database 135 via the processor 125. For instance, a user 105 may manually input equipment data 146 into the user interface 121 of a computing device 120, which may subsequently be obtained from the computing device 120 by the database 135 via a processor 125 operably connected to the computing device 120. In a preferred embodiment, the marine equipment data 146 is obtained by the database 135 from the computing device 120 via the processor 125 whenever a user 105 is in an area in which the computing device 120 has internet connectivity.

The system 100 may determine whether to alert a user 105 that the quantity 146A of a particular piece of marine equipment 110 is low by using a lower limit 146B. Lower limits 146B are defined as the minimum quantity of a particular piece of marine equipment 110 that a user 105 would desire to have in an equipment profile 140. In a preferred embodiment, a user 105 having sufficient permission levels may manually input lower limits 146B for a particular piece of marine equipment 110 of an equipment profile 140 via the user interface 121. For instance, a user 105 may manually input lower limits 146B for various pieces of hybrid bass fishing equipment within a tackle box 115 via the user interface 121. Manually input lower limits may be obtained from the user interface 121 via a processor 125 operably connected to the computing device 120 hosting the user interface 121. The processor 125 may then transfer the lower limits to the corresponding equipment profile 140 within the non-transitory computer-readable medium 126 and/or the database 135. Manually input lower limits may be retrieved by the processor 125 in real-time or at a slower rate. In one preferred embodiment, the lower limits are obtained by the processor 125 from the user interface 121 when a user 105 selects a save function of the user interface 121, wherein the save function has instructions that cause the processor 125 to transfer the lower limits to the corresponding equipment profile 140 within the non-transitory computer-readable medium 126 and/or the database 135.

In another preferred embodiment, a user 105 having sufficient permission levels may choose to have the system 100 automatically assign lower limits 146B to marine equipment 110 within an equipment profile 140. In one preferred embodiment, a user 105 may have the system 100 automatically assign lower limits 146B by selecting a preset equipment profile 140 within the user interface 121, which automatically generates marine equipment 110 needed to enjoy various marine activities as well as lower limits 146B for that marine equipment 110. For instance, a user 105 may select "beginning tackle box" within the user interface 121, wherein the "beginning tackle box" generates lower limits 146B for various pieces of fishing equipment a beginning fisherman may want to include in a tackle box 115. For instance, a user 105 may select "beginning windsurfing outfit" within the user interface 121, wherein the "beginning windsurfing outfit" generates lower limits 146B for various pieces of windsurfing equipment a beginning windsurfer may need in order to learn how to windsurf. The user 105 may then use this preset equipment profile 140 as the basis in which to purchase new marine equipment 110 for the marine activity in which they would like to participate.

Quantity 146A of marine equipment 110 may be represented within the user interface 121 by displayable indicia. The indicia used to represent quantity 146A of marine equipment 110 may depend on the lower limit 146B for a particular piece of marine equipment 110. Indicia may be presented in the user interface 121 as, but are not limited to, colored flags, different colored text, highlighted text, a picture of a lure crossed out, etc. For instance, an equipment profile 140 having a lower limit 146B for a red tail plastic worm of six but a quantity 146A of less than six may be represented within the user interface 121 by an indicia of a worm lure with a red X over it. In a preferred embodiment, text within the user interface 121 varies from red, green, and black depending on the lower limit 146B and quantity 146A of a piece of marine equipment 110. Text representing a particular piece of marine equipment 110 may be red when the lower limit 146B is greater than the quantity 146A of the marine equipment 110. Text representing a particular piece of marine equipment 110 within the user interface 121 may be black when the lower limit 146B is equal to the quantity 146A of the marine equipment 110. Text for a particular piece of marine equipment 110 may be green when the lower limit 146B is less than the quantity 146A of the marine equipment 110.

As previously mentioned, the user interface 121 of a computing device 120 may present marine equipment data 146 of an equipment profile 140 via a display. Because indicia representing marine equipment 110 of an equipment profile 140 may differ depending on the types marine equipment 110 within an equipment profile 140, the indicia presented within the user interface 121 may differ depending on the equipment profile 140 selected. For instance, a tackle box containing fly fishing equipment may be presented using different indicia than a storage compartment on a marine vehicle designed to hold skiing equipment. Additionally, the user interface 121 may be programmed to present only certain types of indicia. For instance, the user interface 121 of a computing device 120 may be programmed to only present indicia related to dry flies, nymphs, and streamers despite the tackle box 115 also containing information regarding rods and reels. In a preferred embodiment, a user 105 may interact with the equipment profile 140 within the user interface 121 in a way such that marine equipment data 146 and indicia of the equipment profile 140 may be presented or hidden. For instance, a user 105 may interact with an equipment profile 140 via a touch screen of a mobile computing device in a way such that the interaction causes the processor 125 to instruct the user interface 121 to present the marine equipment data 146 of a particular piece of marine equipment 110 within the equipment profile 140 via a display. For instance, a user 105 may interact with presented marine equipment data 146 of an equipment profile 140 via a touch screen of a mobile computing device in a way such that the interaction causes the processor 125 to instruct the user interface 121 to hide the marine equipment data 146 of a particular piece of marine equipment 110, which may cause all marine equipment B of an equipment profile 140 to be visible within the user interface 121.

In another preferred embodiment, as illustrated in FIG. 6, geospatial data may be presented to the user 105 via a GIS of the user interface 121 and allow a user 105 to view and/or select a plurality of geographic zones 143, wherein a geographic zone represents a geographic area comprised of a plurality of geographic points. For instance, a user 105 may be able to view their current geolocation 605, primary home zone 610, and primary launch zone 615 via a GIS of the user interface 111, wherein the current geolocation 605 is the location of at least one of a tackle box 115 and user's computing device 120, wherein the primary home zone 610 is a geographic zone 143 in which the user's tackle box 115 is stored, and wherein the primary launch zone 615 is a geographic zone 143 in which the user 105 will participate in a marine activity. In some preferred embodiments, a user 105 may create multiple geographic zones 143 that may cause the system 100 to alert the user 105 when they have forgotten at least one tackle box 115 containing marine equipment needed for said user to participate in a marine activity of an activity profile 141. In a preferred embodiment, the system 100 may use different indicia to represent the level of attention needed by said user 105.

For instance, as illustrated in FIG. 6, the user 105 may create a primary launch zone 615, second launch zone 616, and third launch zone 617. Instructions of the geographic zone 143 may cause the processor 125 to perform a different function when the system 100 determines that at least one of the geolocation of a tackle box and the user's current geolocation 605 has entered one of the launch zones. For instance, the processor 125 may be instructed to send a text message to the user's computing device 120 when said computing device 120 is entering the third launch zone 617, wherein said text message instructs the user 105 that at least one tackle box 115 is missing, wherein said at least one tackle box 115 contains marine equipment 110 associated with an activity profile 141 of a marine activity the user 105 is scheduled to participate. The processor 125 may be instructed to send a notification to the user's computing device 120 and cause the user's computing device 120 to vibrate when entering the second launch zone 616, wherein said notification informs the user 105 of how far they are from the primary launch zone 615 and that the user 105 is missing at least one tackle box 115 associated with an activity profile 141 the user 105 is scheduled to participate. The processor 125 may be instructed to send a notification to the user's computing device 120 and cause the user's computing device 120 to sound an alert when entering the primary launch zone 615, wherein said notification and alert are used to warn the user 105 that they are at the launch location and are missing at least one tackle box 115 associated with an activity profile 141 the user 105 is scheduled to participate.

In another preferred embodiment, the user 105 may create a plurality of home zones within the user interface 121. For instance, as illustrated in FIG. 6, the user 105 may create a primary home zone 610 and second home zone 611. Instructions of the system 100 may cause the processor 125 to perform a different function when the current location of the user's computing device 120 leaves one of the home zones. For instance, the processor 125 may be instructed to send a text message to the user's computing device 120 when the user's computing device 120 leaves the primary home zone 610, wherein said text message instructs the user 105 as to the location of at least one tackle box 115 that is currently missing from the user's 105 possession that said user 105 is expected to use during a marine activity said user 105 is scheduled to participate. The processor 125 may be instructed to send a computer readable signal to the user's computing device 120 when the user 105 leaves the second home zone 611, wherein said computer readable signal causes said computing device 120 to display a notification and cause the computing device to sound an alert, wherein said notification informs the user 105 that certain marine equipment 110 is missing from said user's possession, wherein said alert informs the user 105 that certain marine equipment 110 is missing from said user's possession.

In a preferred embodiment, the user 105 may manually or automatically create geographic zones 143 within the user interface 121 of their computing device 120. For instance, a user 105 may choose, via the user interface 121, to cause their current geolocation 605 to be set as the primary home zone 610, wherein a zone parameter dictating the shape of the primary home zone 610 is automatically generated by the processor 125. In a preferred embodiment, geographic zones 143 are circular in shape; however, a geographic zone may comprise other forms without departing from the inventive subject matter herein. Zone parameters may be used to define the bounds of a geographic zone 143. For instance, a user 105 may define a certain geographic point in the GIS as a central point for a geographic zone 143 and define a radius of the geographic zone 143 to control the size of said geographic zone 143. Some preferred embodiments of a geographic zone 143 may have multiple zone parameters. For instance, a geographic zone 143 may have a first radius and second radius, wherein the geographic zone 143 defined by said first radius and second radius lies between the circumference of the circles created by said first radius and second radius. In a preferred embodiment, the user 105 may manipulate a user interface 111 of the computing device 120 to update zone parameters of the system 100, as illustrated in FIG. 6.

As illustrated in FIG. 7, some embodiments of tackle boxes 115 may comprise an equipment sensor 116 and an equipment transmitter 112, allowing a plurality of tackle boxes 115 to be in direct communication with one another and/or the user's computing device 120. Should a user 105 choose an activity profile 141 specifying marine equipment 110 contained within particular tackle boxes 115, those particular tackle boxes 115 may become linked to one another to form a plurality of linked tackle boxes. Should at least one tackle box 115 of said plurality of linked tackle boxes 115 reach a distance greater than a specified maximum distance 705, the processor 125 may cause an output device of plurality of linked tackle boxes 115 to output an alert, informing the user 105 that at least one tackle box 115 is outside of said specified maximum distance 705. In another preferred embodiment, should a user 105 choose an activity profile 141 specifying marine equipment 110 contained within particular tackle boxes 115 of a plurality of tackle boxes 115, those particular tackle boxes 115 may be configured to send a computer readable signal to the user's computing device 120 that may allow the computing device 120 to determine a distance of said particular tackle boxes 115 from the computing device 120. Should at least one of said particular tackle boxes 115 of the plurality of tackle boxes 115 reach a distance greater than a specified maximum distance 705, an output device of the computing device 120 may output an alert, informing the user 105 that at least one particular tackle box 115 is outside of said specified maximum distance 705. In another preferred embodiment, equipment profiles 140 of an activity profile 141 may be updated based on the proximity of at least one tackle box 115 to the user's computing device 120. For instance, should a tackle box 115 of a plurality of tackle boxes 115 go more than a specified maximum distance 705 from said computing device 120, the equipment profile 140 an activity profile 141 may be updated to reflect the loss of the marine equipment 110 contained within the offending tackle box 115.

Equipment profiles 140 of the system 100 may be saved within the non-transitory computer-readable medium 126. Alternatively, the equipment profile 140 may be saved to a database 135. As used herein, a database 135 refers to a set of related data and the way it is organized. Access to this data is usually provided by a database management system (DBMS) consisting of an integrated set of computer software that allows users 105 to interact with one or more databases 135 and provides access to all of the data contained in the database 135. The DBMS provides various functions that allow entry, storage and retrieval of large quantities of information and provides ways to manage how that information is organized. Because of the close relationship between the database 135 and the DBMS, as used herein, the term database 135 refers to both a database and DBMS.

As shown in FIG. 1, the database 135 may be configured to store data relating to marine equipment 110 therein. The processor 125 may be operably connected to the database 135 via wired or wireless connection. In a preferred embodiment, the information, data, and/or content associated with a piece of marine equipment 110 may be stored as marine equipment data 146 within an equipment profile 140. In a preferred embodiment, the database 135 may be configured to store a plurality of equipment profiles 140 therein and the various information, data, and/or content tied to or associated with such profiles. The database 135 may be a relational database such that the marine equipment data 146 within an equipment profile 140 within the plurality equipment profiles 140 may be stored, at least in part, in one or more tables. Alternatively, the database 135 may be an object database such that the marine equipment data 146 within an equipment profile 140 within the plurality of equipment profiles 140 may be stored, at least in part, as objects. In some instances, the database 135 may comprise a relational and/or object database and a server dedicated solely to managing the content assigned to equipment profiles 140 in the manner disclosed herein. Although the database 135 is represented as a single entity within FIG. 1, it is understood that data, information, and/or content stored within the database or repository, as disclosed herein, may be stored within a plurality of databases without departing from the inventive subject matter disclosed herein.

As mentioned previously, the system 100 may further comprise a server 130. A server 130 may be a search server, a document indexing server, and general web server. Servers 130 may be separate entities performing different functions or similar functions. For instance, two or more servers 130 may be implemented to work as a single server 130 performing the same tasks. Alternatively, one server 130 may perform the functions of multiple servers 130. For instance, a single server 130 may perform the tasks of a web server and an indexing server. Although represented as a single server in FIG. 1, it is understood that multiple servers may be used to operably connect the processor 125 to the database 135 and/or the content repositories. The processor 125 may be operably connected to the server 130 via wired or wireless connection.

Search servers may include one or more computing devices 120 designed to implement a search engine, such as a documents/records search engine, general webpage search engine, etc. Search servers may, for example, may include one or more web servers to receive search queries and/or inputs from users 105, search one or more databases 135 in response to the search queries and/or inputs, and provide documents or information, relevant to the search queries and/or inputs, to users 105. In some implementations, search servers may include a web search server that may provide webpages to users 105, where a provided webpage may include a reference to a web server at which the desired information and/or links is located. The references, to the web server at which the desired information is located, may be included in a frame and/or text box, or as a link to the desired information/document.

Document indexing servers may include one or more computing devices 120 designed to index documents available through networks. Document indexing servers may access other servers 130, such as web servers that host content, to index the content. In some implementations, document indexing servers may index documents/records stored by other servers 130 connected to the network. Document indexing servers may, for example, store and index content, information, and documents relating to user 105 accounts and user-generated content. Web servers may include servers 130 that provide webpages to clients. For instance, the webpages may be HTML-based webpages. A web server may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As illustrated in FIG. 3, the system 100 may also comprise a plurality of permission levels that may allow a user 105 to limit what data within their equipment profiles 140 they share with another user 105. This data may be collectively known as content 315, 335, 355. To access the content 315, 335, 355 stored within the database, users 105 may be required to make a request via a user interface 121. Access to the content 315, 335, 355 within the database 135 may be granted or denied by the processor 125 based on verification of a requesting user's 305, 325, 345 permission level. If the requesting user's 305, 325, 345 permission level is sufficient, the processor 125 may provide the requesting user 305, 325, 345 access to content 315, 335, 355 stored within the database 135. Conversely, if the requesting user's 305, 325, 345 permission level is insufficient, the processor 125 may deny the requesting user 305, 325, 345 access to content 315, 335, 355 stored within the database 135. In an embodiment, permission levels may be based on user roles 310, 330, 350 and administrator roles 370, as shown in FIG. 3. User roles 310, 330, 350 allow requesting users 305, 325, 345 to access content 315, 335, 355 that a user 105 has uploaded and/or otherwise obtained through use of the system 100. User roles 310, 330, 350 allow users 105 (or requesting users 305, 325, 345 authorized by the user 105) to access the user data tied to their own equipment profiles 140 within the database 135. Administrator roles 370 allow administrators 365 to access system wide data.

Alternatively, a requesting user 305, 325, 345 may gain a different permission level by paying a fee. In one embodiment, the requesting user 305, 325, 345 may pay a general fee that may grant the requesting user 305, 325, 345 a permission level that will allow the requesting user 305, 325, 345 to access other users' 105 content 315, 335, 355. For instance, a requesting user 305, 325, 345 may pay a monthly fee of three dollars to access other users' 105 content 315, 335, 355. In another embodiment, a requesting user 305, 325, 345 may pay a fee to a particular user for a permission level that will grant them access the particular user's 105 content 315, 335, 355. For instance, a requesting user 305, 325, 345 may pay a professional fisherman a monthly fee of five dollars to access their content 315, 335, 355. A requesting user 305, 325, 345 may pay for a higher permission level using a Point-of-Sale system operably connected to the system 100. In an embodiment, the computing device 120 hosting a user interface 121 may be operably connected to the Point-of-Sale system in a way such that the Point-of-Sale system may communicate with the database 135 so that it alters the requesting user's 305, 325, 345 permission level. When a higher permission level is purchased by the requesting user 305, 325, 345, the Point-of-Sale system may automatically communicate with the database 135 in a way such that it alters the permission level. In one embodiment, the user interface 121 may ask the requesting user 305, 325, 345 which content 315, 335, 355 the requesting user 305, 325, 345 would like to obtain from other users' 105 profiles.

In another embodiment, equipment profiles 140 may be assigned to a user 105 in a way such that a user 105 may access such content via a user interface 121. In an embodiment, the system 100 may be configured to send a user 105 a notification indicating that another user 105 has shared information with the user 105. To access the data within a user's 105 equipment profiles 140, a user 105 may make a user request via the user interface 121 to the processor 125. In an embodiment, the processor 125 may grant or deny the request based on the permission level associated with the requesting user 305, 325, 345. Only users 105 having appropriate user roles 310, 330, 350 or administrator roles 370 may access the data associated with a user's 105 equipment profile 140. For example, as illustrated in FIG. 3, data within equipment profiles 140 assigned to requesting user 2's 325 content 335 may be selectively shared with requesting user 1 305 by granting requesting user 1 305 access to all of requesting user 2's 325 content 335. Alternatively, requesting user 2 325 may restrict access to their content 335 in a way such that requesting user 1 305 may only access certain types of data within requesting user 2's 325 content 335. For example. Requesting user 2 325 may grant requesting user 1 305 access to environmental data and GPS data of an activity profile 141 but may restrict access to their equipment profiles 140. In this instance, requesting user 1 305 may view content 315 of requesting user 2's 325 activity profile 141 concerning environmental data and GPS data but may not view user 2's content 335 concerning what equipment requesting user 2 325 has in an equipment profile 140 associated with the activity profile 141.

FIG. 4 provides a flow chart illustrating certain, preferred method steps that may be used to carry out the method for creating an equipment profile 140 and saving it within the system 100. Step 405 indicates the beginning of the method. In step 410, a user 105 may choose to create a new equipment profile 140. When a user 105 chooses to create a new profile, the user 105 may be prompted to provide a title for the equipment profile 140. Any title may be assigned that helps a user 105 identify a specific equipment profile 140 having particular marine equipment 110. For instance, a user 105 may assign a title of "hybrid bass tackle box" for tracking marine equipment 110 used to catch hybrid bass. For instance, a user 105 may assign the title of "high wind sailing outfit" for tracking marine equipment 110 used when sailing in high wind conditions. Once an equipment profile 140 has been assigned a title, the user 105 may input marine equipment data 146 for each piece of marine equipment 110 desired to be in the equipment profile 140. This may be done manually or automatically using the manners described herein. Lower limits 146B may be established by a user 105 manually inputting the data into the user interface 121. Alternatively, a user 105 may select a preset tackle box via the user interface 121. In a preferred embodiment, the lower limits 146B correspond to a minimum quantity 146A of a particular piece of marine equipment 110 that a user 105 would prefer to have in their inventory. For instance, if a user 105 would like to have at least three Copper John size 16 flies in their tackle box 115, a user 105 would set the lower limit 146B to three.

When providing the marine equipment data 146 to the user interface 121, a user 105 may be required to enter certain data fields, such as lower limits 146B. If these fields are not provided by the user 105, the user 105 may be prevented from creating an equipment profile 140. Accordingly, in one preferred embodiment, the method may further comprise a missing field step 415. During step 415, the processor 125 reviews the marine equipment data 146 provided by the user 105 to assess whether all required fields have been inputted. If all required fields have been inputted, the user interface 121 may subsequently proceed to the save virtual tackle box step 420. If a user 105 fails to provide one or more required fields, the user interface 121 may once again prompt the user 105 to input the missing fields marine equipment data 146 during step 410.

Once all required information for an equipment profile 140 has been input, step 420 transforms the marine equipment data 146 into an equipment profile and saves the equipment profile 140 within the database 135. Alternatively, step 420 may save the equipment profiles 140 within the non-transitory computer-readable medium 126 of the computing device 120, which a server 130 may then retrieve via the processor 125 and subsequently transfer to the database 135. Once the equipment profile has been saved and transferred to the database 135, the method may proceed to the terminate method step 435. In a preferred embodiment, a user 105 may choose to revise or edit data associated therewith in step 425. Upon choosing to revise or edit an equipment profile 140, a user 105 may modify marine equipment data 146 associated with an equipment profile 140 in step 430. This may be done manually or automatically as described herein. Once the marine equipment data 146 of an equipment profile 140 has been modified, the marine equipment data 146 is stored within the database 135 or non-transitory computer-readable medium 126 in step 420. The processor 125 may then proceed to the terminate method step 435.

FIG. 5 provides a flow chart illustrating certain, preferred method steps that may be used to carry out the method for generating and displaying indicia for marine equipment 110 within an equipment profile 140. Step 505 indicates the beginning of the method. In the perform query step 510, the processor 125 may perform a query to determine which indicia to generate for marine equipment 110 of an equipment profile 140 by comparing the quantity 146A of a particular piece of marine equipment 110 with the lower limit 146B. Based on the foregoing comparison, the processor 125 may take the appropriate action in step 515. In a preferred embodiment, the processor 125 may generate indicia in the user interface 121 for each of the pieces of marine equipment 110 of an equipment profile 140, which may illustrate the inventory level of each piece of marine equipment 110. Indicia may be presented in the user interface 121 as, but not limited to, text, highlights, checks, X's, strikethroughs, symbols, images, or any other suitable indicator. In a preferred embodiment, the processor 125 assigns one of three indicia to be presented within the user interface 121: red text, green text, and black text. The processor 125 may assign a red text indicia if a piece of marine equipment 110 within the equipment profile 140 has a lower quantity 146A than the lower limit 146B as set by the user 105 in step 520. The processor 125 may assign a black text indicia if a piece of marine equipment 110 within the equipment profile 140 has an equal quantity 146A to the lower limit 146B as set by the user 105 in step 521. The processor 125 may assign a green text indicia if a piece of marine equipment 110 within the equipment profile 140 has a higher quantity 146A than the lower limit 146B as set by the user 105 in step 522.

Once indicia are assigned to marine equipment 110 within the equipment profile 140, the processor 125 may communicate with a display operably connected to the processor 125 in way such that the display may present the indicia within the user interface 121 to the user 105 during step 525. In another preferred embodiment, the equipment data 146 of an equipment profile 140 may also be presented to the user 105 via the display. In yet another preferred embodiment, the computing device 120 may be configured in a way such that the user 105 may operate the computing device 120 hosting the user interface 121 in a way that causes the marine equipment data 146 of an equipment profile 140 to not be visible to the user 105 via the display. Alternatively, the computing device 120 may be configured in a way such that the user 105 may operate the computing device 120 hosting the user interface 121 in a way that causes the user interface 121 to present the marine equipment data 146 of an equipment profile 140 to the user 105 via the display. Once the processor 125 has presented the indicia to the user 105 via the display, the method may proceed to the terminate method step 530.

Figure 8:
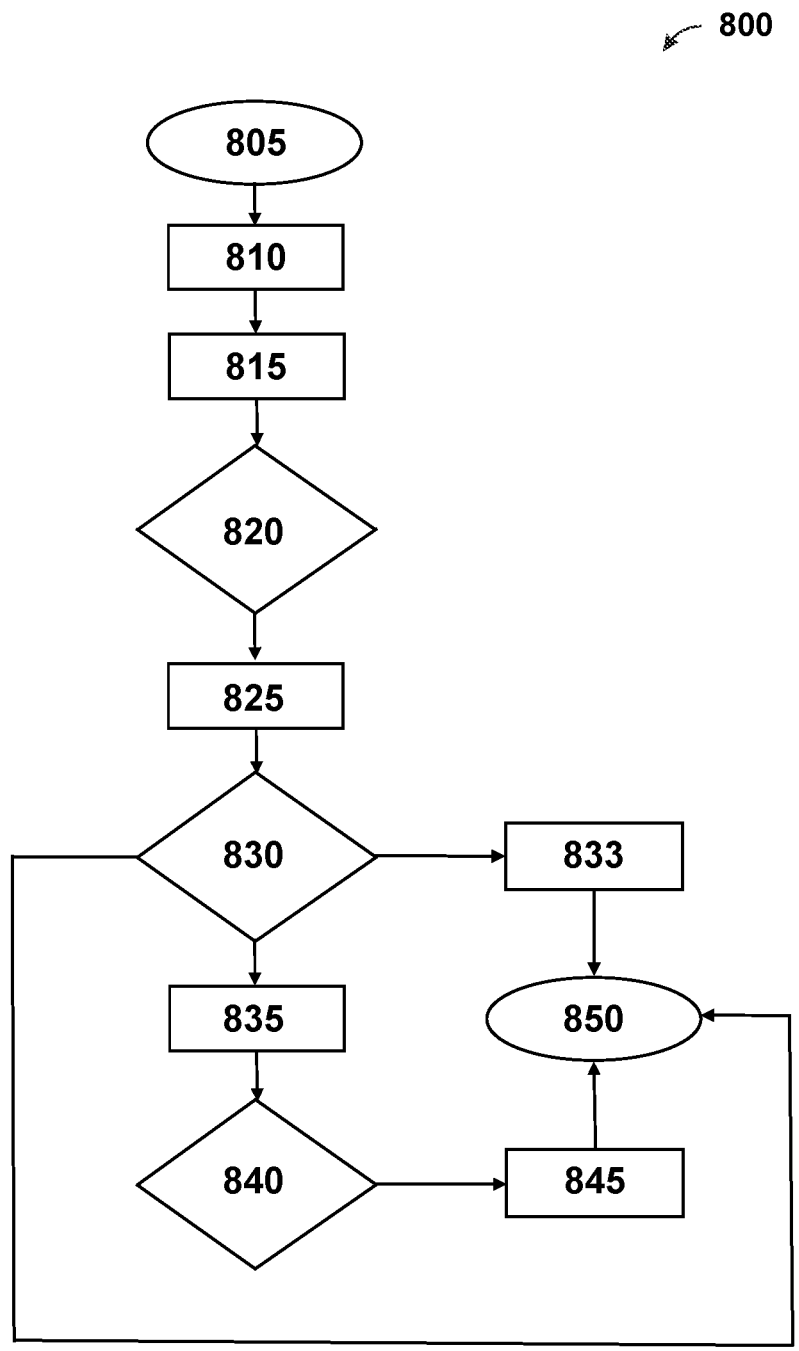
FIG. 8 is a flow chart illustrating certain method steps of a method embodying features consistent with the principles of the present disclosure.

FIG. 8 provides a flow chart 800 illustrating certain, preferred method steps that may be used to carry out the method for determining if marine equipment 110 pertinent to a marine activity a user 105 is scheduled to participate is in said user's 105 possession and subsequently alerting said user 105 when said marine equipment is missing from said user's 105 possession. Step 805 indicates the beginning of the method. During step 805, the processor 125 may receive equipment data 146 from at least one tackle box 115 as well as geospatial data from said at least one tackle box 115 and a user's computing device 120. The processor 125 may then perform a query to determine if at least one geographic zone 143 and at least one activity profile 141 have been specified by the user 105 during step 815. In a preferred embodiment, the geographic zone 143 is a home zone. Based on the results of the query, the processor 125 may perform an action during step 820. If the processor 125 determines that at least one geographic zone 143 and an activity profile 141 have not been specified, the method may proceed to terminate method step 850. If the processor 125 determines that at least one geographic zone 143 and an activity profile 141 have been specified, the processor 125 may proceed to step 825.

During step 825, the processor 125 may perform a query to determine if the geospatial data of the at least one tackle box 115 and the user's 105 computing device 120 are encompassed within the at least one geographic zone 143, wherein said at least one geographic zone 143 comprises a plurality of geospatial points. Based on the results of the query, the processor 125 may perform an action during step 830. If the processor 125 determines that the geospatial data of the tackle box 115 and the user 105 do match a geospatial point of said plurality of geospatial points of said at least one geographic zone 143, the processor 125 may return to step 825. If the processor 125 determines that the geospatial data of only one of the at least one tackle box 115 and the user's 105 computing device 120 do not match said geospatial point of said plurality of geospatial points of said at least one geographic zone 143, the processor 125 may alert said user 105 of the missing marine equipment during step 833 before proceeding to the terminate method step 850. If the processor 125 determines that both the geospatial data of the at least one tackle box 115 and the user's 105 computing device 120 do not match a geospatial point of said plurality of geospatial points of said at least one geographic zone 143, the processor 125 may perform a query to determine if the totality of equipment data 146 of the at least one tackle box 115 in the user's 105 possession is outside of a lower limit 146B of the activity profile 141 during step 835. Based on the results of the query, the processor 125 may perform an action during step 840.

If the processor 125 determines that the totality of equipment data 146 of the at least one tackle box 115 in the user's 105 possession is not outside of a lower limit 146B, the processor 125 may proceed to the terminate method step 850. If the processor 125 determines that that the totality of equipment data 146 of the at least one tackle box 115 in the user's 105 possession is outside of a lower limit 146B, the processor 125 may execute instructions assigned to the geographic zone 143 during step 845, wherein said instructions may cause said processor 125 to send a computer readable signal to said computing device 120, causing said computing device 120 to perform an action that may alert said user 105 of the missing marine equipment 110. In some embodiments, the system 100 may alert the user 105 as well as inform the user 105 as to the location of at least one tackle box 115 containing the missing marine equipment 110. For instance, an at least one tackle box 115 fitted with a geolocation device may provide the system 100 with geospatial data that the processor 125 may use to visualize via a GIS the location of the at least one tackle box 115 containing the missing marine equipment 110. Once the processor 125 has executed the instructions assigned to the geographic zone 143, the method may proceed to the terminate method step 850.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one input/output device.

These computer programs, which may also be referred to as programs, software, software applications, applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter may be made without departing from the principles and scope of the inventive subject matter.

What is claimed is:

1. A system for managing marine equipment comprising:
  a tackle box having an equipment sensor and a geolocation device,
    wherein said tackle box is configured to hold marine equipment fitted with an equipment transmitter,
    wherein said equipment transmitter transmits a computer readable signal to said equipment sensor containing marine equipment data,
    wherein said marine equipment data is represented within a plurality of equipment profiles,
    wherein at least one equipment profile of said plurality of equipment profiles is associated of an activity profile,
    wherein said geolocation device collects geospatial data relevant to a geolocation of said tackle box,
  a processor operably connected to said tackle box,
  a computing device having a user interface and operably connected to said processor,
    wherein said computing device is configured to receive said marine equipment data from said tackle box,
    wherein said computing device is configured to receive said geospatial data from said tackle box, and
  a non-transitory computer-readable medium coupled to said processor and having instructions stored thereon, which, when executed by said processor, cause said processor to perform operations comprising:
    receiving said marine equipment data from said tackle box,
    receiving said geospatial data from said tackle box,
    obtaining a geographic zone from said computing device,
      wherein said geographic zone comprises a plurality of geographic points,
    determining if said geospatial data matches a geographic point of said plurality of geographic points of said geographic zone,
    determining if a quantity of said marine equipment as determined by said marine equipment data matches a lower limit of said at least one equipment profile of said activity profile when said geospatial data does not match said geographic point of said plurality of geographic points of said geographic zone, and
    transmitting a computer readable signal to said computing device when said quantity of said marine equipment is outside of said lower limit,
      wherein said computer readable signal contains instructions that cause said computing device to alert a user that said quantity of said marine equipment is outside of said lower limit.

2. The system of claim 1 further comprising:
  a database operably connected to said processor,
    wherein said database is configured to store said marine equipment data, plurality of equipment profiles, activity profile, and geographic zone within a user profile, and
  additional instructions stored on said non-transitory computer-readable medium, which, when executed by said processor, cause said processor to perform additional operations comprising:
    transmitting said marine equipment data, plurality of equipment profiles, activity profile, and geographic zone to said database.

3. The system of claim 1, further comprising additional instructions stored on said non-transitory computer-readable medium, which, when executed by said processor, cause said processor to perform additional operations comprising:
   determining if said quantity of said marine equipment as determined by said marine equipment data matches a lower limit of said at least one equipment profile of said activity profile when said geospatial data does match said geographic point of said plurality of geographic points of said geographic zone.

4. The system of claim 1, wherein said computing device further comprises said geolocation device.

5. The system of claim 4, wherein said user interface is operably connected to a Point-of-Sale system of a third-party, wherein said geospatial data of said computing device is used to connect said user with said third-party having a geolocation closest to said geolocation of said computing device, wherein said user interface is configured to allow for a purchase of said marine equipment sold by said third-party via said Point-of-Sale system.

6. The system of claim 5, further comprising additional instructions stored on said non-transitory computer-readable medium, which, when executed by said processor, cause said processor to perform additional operations comprising:
   obtaining geospatial data from said geolocation device of said computing device,
   comparing said geospatial data of said geolocation device with said geospatial data of a plurality of third-parties,
   listing said plurality of third-parties in order of proximity to said geolocation of said computing device, and
   connecting said computing device to said Point-of-Sale system of said third-party in a way such that said user may purchase said marine equipment.

7. The system of claim 4, further comprising additional instructions stored on said non-transitory computer-readable medium, which, when executed by said processor, cause said processor to perform additional operations comprising:
   receiving said geospatial data of said computing device from said computing device,
   determining if said geospatial data of said computing device matches said geographic point of said plurality of geographic points of said geographic zone, and
   transmitting a computer readable signal to said computing device when only one of said geospatial data of said tackle box and said geospatial data of said computing device does not match said geographic point of said plurality of geographic points of said geographic zone, wherein said computer readable signal contains instructions that cause said computing device to alert said user that said tackle box and said computing device are not both in said geographic zone.

8. The system of claim 1, wherein said tackle box further comprises said equipment transmitter, wherein said tackle box is configured to communicate with a plurality of tackle boxes having said equipment transmitter, wherein each tackle box of said plurality of tackle boxes contains said marine equipment, wherein said marine equipment data of said marine equipment of said plurality of tackle boxes is saved within said plurality of equipment profiles.

9. The system of claim 8, further comprising additional instructions stored on said non-transitory computer-readable medium, which, when executed by said processor, cause said processor to perform additional operations comprising:
   determining which said tackle box of said plurality of tackle boxes contains said marine equipment associated with said marine equipment data of an equipment profile of an activity profile, and
   linking each said tackle box of said plurality of tackle boxes that contains said marine equipment associated with said marine equipment data of said equipment profile of said activity profile to create a plurality of linked tackle boxes.

10. The system of claim 9, further comprising an output device of said tackle box, wherein said output device of each said tackle box of said plurality of linked tackle boxes is configured to emit an alert when at least one said tackle box of said plurality of linked tackle boxes goes beyond a specified distance from another said tackle box of said plurality of linked tackle boxes.

11. The system of claim 9, further comprising said additional instructions stored on said non-transitory computer-readable medium, which, when executed by said processor, cause said processor to perform said additional operations comprising:
   receiving said marine equipment data from said plurality of linked tackle boxes,
      wherein said marine equipment data of said plurality of linked tackle boxes represents said marine equipment available for a marine activity of said activity profile, and
   altering said marine equipment data of said equipment profile of said activity profile when at least one of said plurality of linked tackle boxes goes beyond a specified distance from said plurality of linked tackle boxes.

12. A system for managing marine equipment comprising:
   a tackle box having an equipment sensor and a geolocation device,
      wherein said tackle box is configured to hold marine equipment fitted with an equipment transmitter,
      wherein said equipment transmitter transmits a computer readable signal to said equipment sensor containing marine equipment data,
      wherein said geolocation device collects geospatial data relevant to a geolocation of said tackle box,
   a processor operably connected to said tackle box,
   a computing device having a user interface and said geolocation device,
      wherein said computing device is operably connected to said processor, and
   a non-transitory computer-readable medium coupled to said processor and having instructions stored thereon, which, when executed by said processor, cause said processor to perform operations comprising:
   receiving said geospatial data of said tackle box from said tackle box,
   receiving said geospatial data of said computing device from said computing device,
   obtaining a geographic zone from said computing device,
      wherein said geographic zone comprises a plurality of geographic points,
   determining if said geospatial data of said tackle box matches a geographic point of said plurality of geographic points of said geographic zone,
   determining if said geospatial data of said computing device matches said geographic point of said plurality of geographic points of said geographic zone, and
   transmitting a computer readable signal to said computing device when only one of said geospatial data of said tackle box and said geospatial data of said computing device does not match said geographic point of said plurality of geographic points of said geographic zone, wherein said computer readable signal contains instructions that cause said computing device to alert a user that said tackle box and said computing device are not both in said geographic zone.

13. The system of claim 12, wherein said tackle box further comprises said equipment transmitter, wherein said tackle box is configured to communicate with a plurality of tackle boxes having said equipment transmitter, wherein each tackle box of said plurality of tackle boxes contains said marine equipment, wherein said marine equipment data of said marine equipment of said plurality of tackle boxes is saved within a plurality of equipment profiles.

14. The system of claim 13, further comprising additional instructions stored on said non-transitory computer-readable medium, which, when executed by said processor, cause said processor to perform additional operations comprising:
   determining which said tackle box of said plurality of tackle boxes contains said marine equipment associated with said marine equipment data of an equipment profile of an activity profile, and
   linking each said tackle box of said plurality of tackle boxes that contains said marine equipment associated with said marine equipment data of said equipment profile of said activity profile to create a plurality of linked tackle boxes.

15. The system of claim 14, further comprising an output device of said tackle box, wherein said output device of each said tackle box of said plurality of linked tackle boxes is configured to emit an alert when at least one said tackle box of said plurality of linked tackle boxes goes beyond a specified distance from another said tackle box of said plurality of linked tackle boxes.

16. The system of claim 15, further comprising said additional instructions stored on said non-transitory computer-readable medium, which, when executed by said processor, cause said processor to perform said additional operations comprising:
   receiving said marine equipment data from said plurality of linked tackle boxes,
      wherein said marine equipment data of said plurality of linked tackle boxes represents said marine equipment available for a marine activity of said activity profile, and
   altering said marine equipment data of said equipment profile of said activity profile when at least one of said plurality of linked tackle boxes goes beyond a specified distance from said plurality of linked tackle boxes.

17. The system of claim 12, wherein said user interface is operably connected to a Point-of-Sale system of a third-party, wherein said geospatial data of said computing device is used to connect said user with said third-party having a geolocation closest to said geolocation of said computing device, wherein said user interface is configured to allow for a purchase of said marine equipment sold by said third-party via said Point-of-Sale system.

18. A system for managing marine equipment comprising:
   a plurality of tackle boxes configured to hold marine equipment fitted with an equipment transmitter, said plurality of tackle boxes comprising;
      an equipment sensor,
         wherein said equipment transmitter of said marine equipment transmits a computer readable signal to said equipment sensor containing marine equipment data,
      a geolocation device,
         wherein said geolocation device collects geospatial data relevant to a geolocation of said plurality of tackle boxes,
      said equipment transmitter,
         wherein said equipment transmitter of said plurality of tackle boxes facilitates communication between each tackle box and said plurality of tackle boxes,
   a processor operably connected to said plurality of tackle boxes,
   a computing device having a user interface and operably connected to said processor, and
   a non-transitory computer-readable medium coupled to said processor and having instructions stored thereon, which, when executed by said processor, cause said processor to perform operations comprising:
      obtaining an activity profile from said computing device,
         wherein an equipment profile of said activity profile contains marine equipment data associated with a marine activity of said activity profile,
      receiving said marine equipment data from said plurality of tackle boxes,
      determining which said tackle box of said plurality of tackle boxes contains said marine equipment associated with said marine equipment data of said equipment profile of said activity profile, and
      linking each said tackle box of said plurality of tackle boxes that contains said marine equipment associated with said marine equipment data of said equipment profile of said activity profile to create a plurality of linked tackle boxes.

19. The system of claim 18, further comprising an output device of each said tackle box of said plurality of tackle boxes, wherein said output device is configured to emit an alert when at least one of said tackle box of said plurality of linked tackle boxes goes beyond a specified distance from another said tackle box of said plurality of linked tackle boxes.

20. The system of claim 18, further comprising additional instructions stored on said non-transitory computer-readable medium, which, when executed by said processor, cause said processor to perform additional operations comprising:
   receiving said marine equipment data from said plurality of linked tackle boxes,
      wherein said marine equipment data of said plurality of linked tackle boxes represents said marine equipment available for a marine activity of said activity profile, and
   altering said marine equipment data of said equipment profile of said activity profile when at least one of said plurality of linked tackle boxes goes beyond a specified distance from said plurality of linked tackle boxes.

* * * * *